(12) United States Patent
Pan et al.

(10) Patent No.: US 7,533,593 B2
(45) Date of Patent: May 19, 2009

(54) BALL SCREW UNIT WITH DUST CLEANING AND BALL DEFLECTING ELEMENT FIXING MECHANISM

(75) Inventors: Hung-Sung Pan, Taichung (TW); Wen-Chia Wu, Taichung (TW); Chien-Wei Tsou, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 385 days.

(21) Appl. No.: 11/413,097

(22) Filed: Apr. 28, 2006

(65) Prior Publication Data

US 2007/0251343 A1  Nov. 1, 2007

(51) Int. Cl.
*F16H 1/24* (2006.01)
(52) U.S. Cl. ..................... 74/424.87; 74/89.4
(58) Field of Classification Search .............. 74/424.81, 74/424.82, 424.86, 424.87, 89.4; 411/517, 411/518, 903, 542; 403/372, 365, DIG. 7, 403/367, 355
See application file for complete search history.

(56) References Cited

U.S. PATENT DOCUMENTS

| | | | | |
|---|---|---|---|---|
| 3,423,141 A | * | 1/1969 | Pethis | 384/482 |
| 3,646,827 A | * | 3/1972 | Patterson | 74/89.4 |
| 3,669,460 A | * | 6/1972 | Wysong | 277/354 |
| 3,709,572 A | * | 1/1973 | Pethis | 277/376 |
| 5,664,459 A | * | 9/1997 | Muhleck et al. | 74/424.87 |
| 6,178,839 B1 | * | 1/2001 | Yoshida et al. | 74/424.87 |
| 2005/0087029 A1 | * | 4/2005 | Perni et al. | 074/89.4 |
| 2008/0036162 A1 | * | 2/2008 | Liu | 277/631 |

* cited by examiner

*Primary Examiner*—Richard WL Ridley
*Assistant Examiner*—Terence Boes (57) ABSTRACT

A ball screw unit with dust cleaning and ball deflecting element fixing mechanism includes an annular inlaid slot along the inner surface of a nut proper proximate to the outside of a ball deflecting element. A fixed dust scrape formed of a C shaped annular packing is installed in the annular inlaid slot. The C shaped annular packing is covered with a soft covering layer at its inner fringe and the outer fringe of the soft covering layer is just stuffed in the annular inlaid slot of the nut proper. Inner fringe of the soft covering layer is formed into a spiral scraper blade corresponding to the rolling spiral slot of the screw blot. The fixed dust scraper is tightly fixing the ball deflecting element to the nut proper by means of the resiliency of the soft covering layer to clean the dust along the rolling spiral slot with its spiral scraper blade thereby serving as a dust cleaner.

9 Claims, 8 Drawing Sheets

BALL SCREW UNIT WITH DUST CLEANING AND BALL DEFLECTING ELEMENT FIXING MECHANISM

BACKGROUND OF THE INVENTION

1. Field of the Invention

The present invention relates to a ball screw unit with dust cleaning and ball deflecting element fixing mechanism, more particularly, to a mechanism for dust cleaning and ball deflecting element fixing which has a specially designed and structurally simple dust scraper to clean the dust along the ball screw unit and at the same time, forcibly hold the ball deflecting element at position.

2. Description of the Prior Art

The ball screw unit is well-known for its excellent mobility with mechanical precisement, suitable for serving precision industry such as for fabrication of mounting of a finishing tool thereby trending towards miniaturization and simplification in its structure. The conventional ball screw unit is essentially composed of a ball screw and a nut proper coupled with it. Each of two ends of the nut proper is provided with a ball deflecting element for circulating balls to roll in and out the ball screw unit. The ball deflecting ingress of dust, rubbishes and trashes into the nut proper, a scraper is usually equipped at one side of the ball deflecting element to perform cleaning work. It is therefore a conventional ball screw unit is deemed to have a complicated structure including lots of component parts resulting in increasing difficulty in fabrication, assembly and thus raising production cost.

Figure 1:
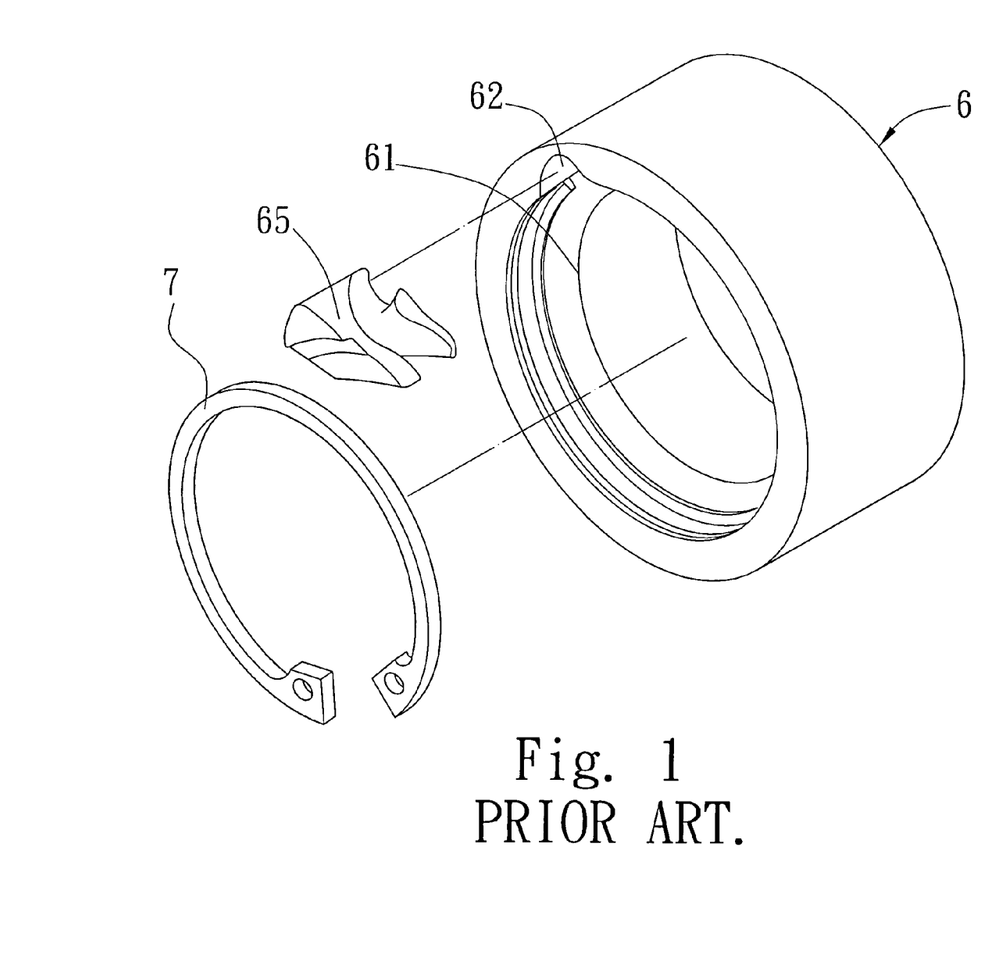
FIG. 1 is a three dimensional exploded view of a nut proper of a conventional ball screw unit.
Figure 2:
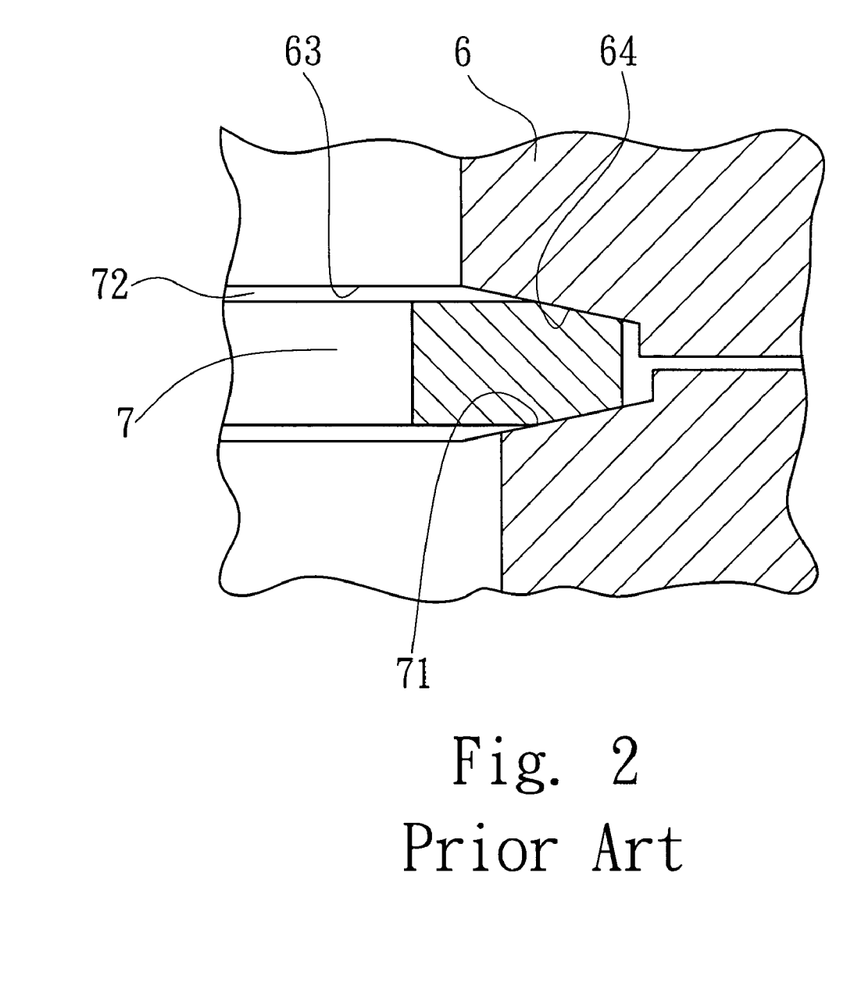
FIG. 2 is a fractional enlarged sectional view of the nut proper of FIG. 1 associated with a C shaped annular packing disclosed by a recent patented document.

As shown in FIG. 1 and FIG. 2 (a recent patented case), the essential feature of the nut proper 6 has a rolling spiral slot 61 formed on the inner wall of the nut proper 6, and a circulation tunnel 62 is formed at each end of the rolling spiral slot 61 for leading to the ball deflecting element 65. It is characterized by having an annular inlaid slot 63 at each end of the nut proper 6 facing against the outside of the ball deflecting element 65, and a C shaped annular packing 7 is clogged in the annular inlaid slot 63, furthermore, the contact surface between the inner wall of the annular inlaid slot 63 and outer wall of the C shaped annular packing 7 are chamfered to form a sloped surface 64 and 71 respectively (see FIG. 2) such that the C shaped annular packing 7 clogs tightly in the annular inlaid slot 63 and forcibly hold the ball deflecting element 65.

Meanwhile, the structure shown in FIG. 2 is problematic. The C shaped annular packing can not perfectly impose on the ball deflecting element 65 should material used be improper and the mechanical finishing unqualified so as to leave a gap 72 therebetween thereby causing the ball deflecting element 65 to vibrate during the operation of the ball screw unit. Besides, the afore said chamfered surfaces 64 and 71 on the annular inlaid slot 63 and the C shaped packing 7 are uneasy to form, and it is hard to stably hold the ball deflecting element 65 at position without the chamfered surfaces 64 and 71. Should there is no sufficient fabrication technique, there is no way to manufacture such a strictly precise mechanical product.

In addition, the above described structure is only aimed at fixing the ball deflecting element 65, it has not yet considered equipping dust clearing means between two sides of the nut proper 6 and the corresponding ball screw. The entire structure is unable to work perfectly unless it is constructed more complicated.

For these defects noticeable on the prior arts, an improvement is seriously required.

The inventor of the present invention has put forth every effort for years by continuous research and experimentation attempting to find out the remedy to palliate the inherent shortcomings of the conventional techniques described above, and at last has succeeded in coming out with the present invention.

SUMMARY OF THE INVENTION

Accordingly, the present invention is to provide a ball screw unit with dust cleaning and ball deflecting element fixing mechanism which is simply constructed to be easily assembled, furthermore, it is able to firmly hold the ball deflecting element at position in addition to its dust clearing function.

The present invention provides a ball screw unit with dust cleaning and ball deflecting element fixing mechanism in which a nut proper having an inner rolling spiral slot in correspondence with that of a ball screw, is coupled with the ball screw, the rolling spiral slot of the nut proper is equipped with a circulation tunnel leading to a ball deflecting element at its end, and an annular inlaid slot is formed at the place facing to the outside of the ball deflecting element of the nut proper. A fixed scraper formed of a C shaped annular packing is covered with a resilient soft covering layer. The width between two sides of the soft covering layer is broader than that of the annular inlaid slot, and the inner fringe of the soft covering layer is formed in to a continuous spiral scrapping tip facing against the rolling spiral slot of the ball screw.

The fixed scraper is engaged within the annular inlaid slot with its one side forcibly in contact with the ball deflecting element, and the upper portion of the scrapping tip is formed into a continuous two-faced arcuate scrapping edge facing against the spiral wall and the crest of the ball screw.

BRIEF DESCRIPTION OF THE DRAWINGS

The drawings disclose illustrative embodiments of the present invention which serve to exemplify the various advantages and objects hereof, and are as follows:

FIG. 3(*a*) is a front view of the ball screw unit with dust cleaning and ball deflecting element fixing mechanism according to the present invention;

FIG. 3(*b*) is a side sectional view of the ball screw unit with dust cleaning and ball deflecting element fixing mechanism according to the present invention;

FIG. 3(*c*) is an enlarged schematic view of the dust cleaning scraper according to the present invention;

DETAILED DESCRIPTION OF THE PREFERRED EMBODIMENT

Figure 3A:
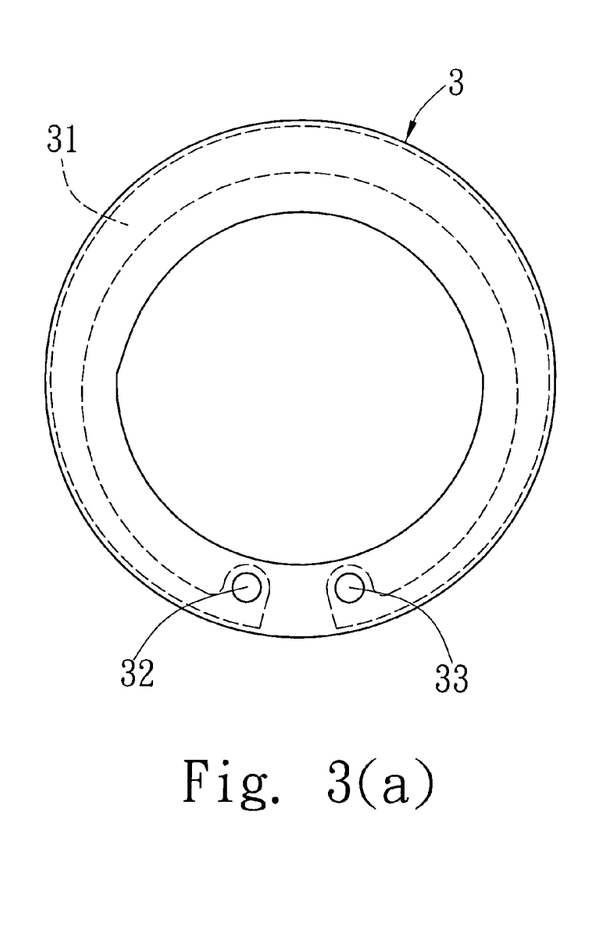
Figure 3B:
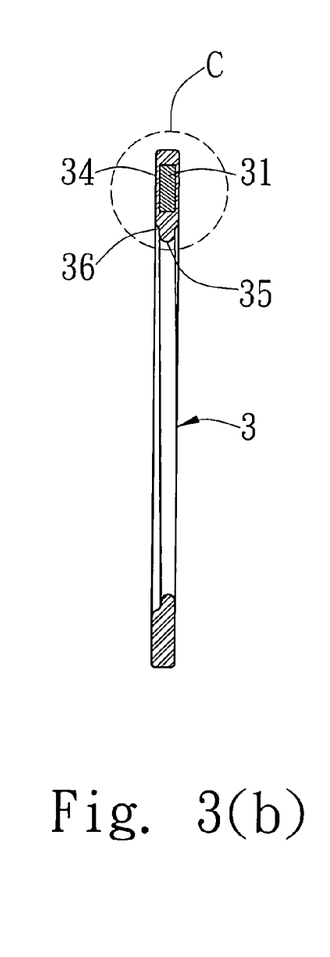
Figure 3C:
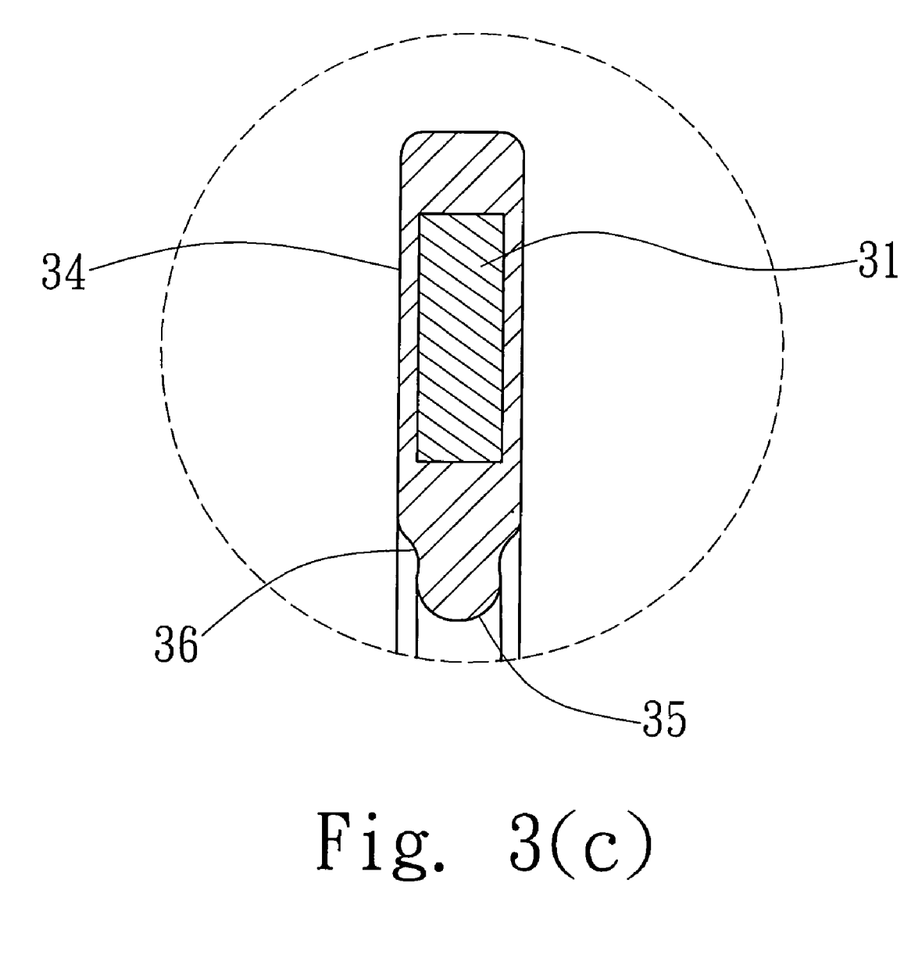

Referring to FIG. 3(*a*) through FIG. 3(*c*), in the present invention a rolling spiral slot is formed along the surface of a ball screw, and a nut proper 1 having a spiral rolling slot 11 is coupled with the ball screw. Each end of the spiral rolling slot 11 is provided with a ball deflecting element 2 for balls (not shown) to circulate between the spiral rolling slot 11 and the ball deflecting elements 2 thereby causing the ball screw to displace with respect to the nut proper. The basic function of the ball screw unit is well-known to those skilled in the mechanical engineering thus it is unnecessary to discuss in detail.

Figure 4:
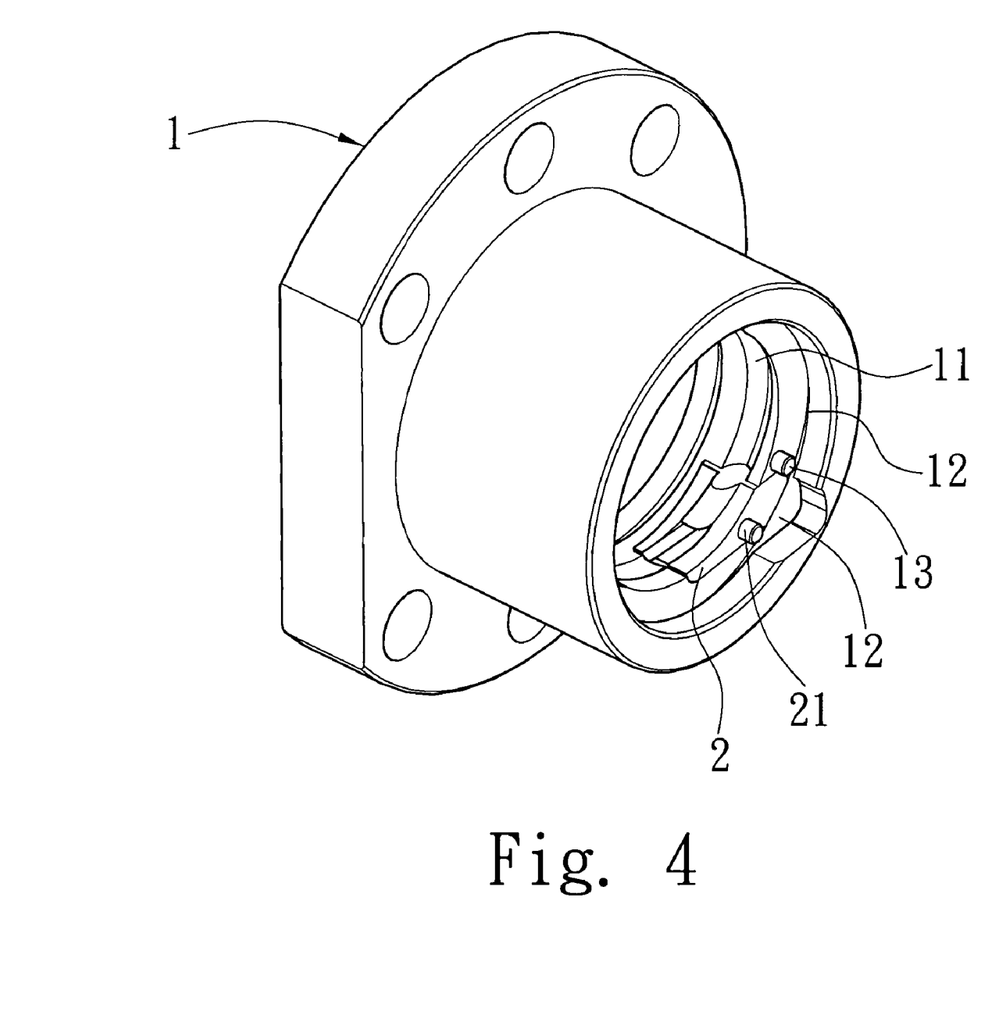
FIG. 4 is schematic view illustrating the positional relationship between the ball deflecting element and the nut proper according to the present invention.

Now the novelty of the present invention will be described in detail with reference to FIG. 4 through FIG. 6. The ball deflecting element 2 connected to the nut proper 1 has an annular inlaid slot 12 connected to it, and there is at least one stop pillar 13 provided on the wall surface of the annular inlaid slot 12 abutting on the ball deflecting element 2, while at least one stop pillar 21 is provided at the outer side surface of the ball deflecting element 2, and an annular fixed scraper 3 is installed in the annular inlaid slot 12 to impose on the ball deflecting element 2.

The aforesaid annular fixed scraper 3, which being formed of a C shape annular packing 31, is enclosed by a resilient soft covering layer 34 around the annular packing 31. the soft covering 34 is made of rubber or plastic with a width slightly larger than that of the annular inlaid slot 12 such that the scraper 3 is able to be forcibly imposed on the annular inlaid slot 12 after being installed, and forcibly impose on the side surface of the ball deflecting element 2 with its sides as well thereby stably holding the ball deflecting element 2 at position.

Again referring to FIG. 3(c) and FIG. 6, the soft covering layer 34 of the scraper 3 has a continuous spiral scrapping tip 35 formed along its inner fringe so as to dust out the spiral rolling slot 11, while the upper portion of the scrapping tip 35 is formed into a continuous two-face arcuate scrapping edge 36 pressing against the spiral wall and the crest of the ball screw so as to effectively keep the ball screw clean.

Figure 7:
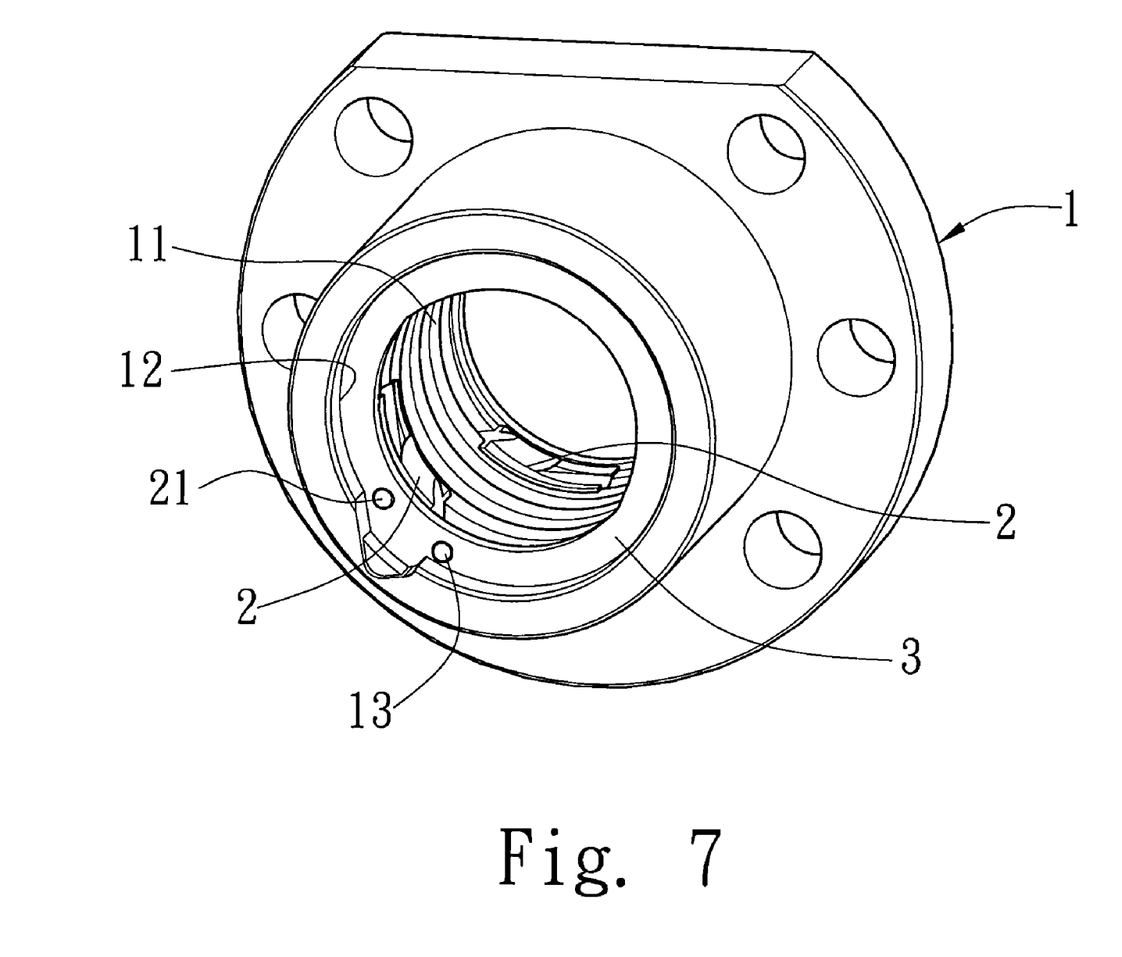
FIG. 7 is a perspective view of the nut proper equipped with the scraper for fixing the ball deflecting element according to the present invention.

As shown in FIG. 3(a) and FIG. 7, a detention hole 32 or 33 is respectively formed at each of the two free ends of the annular packing 31. One of them 32 is paired with the stop pillar 21 provided at the outer side surface of the ball deflecting element 2, and the other one 33 is paired with the other stop pillar 13 provided in the annular inlaid slot 12 of the nut proper 1. By confining the stop pillars 21 and 13 respectively in the detention holes 32 and 33 respectively, the scraper 3 can be tightly fixed at position.

Figure 5:
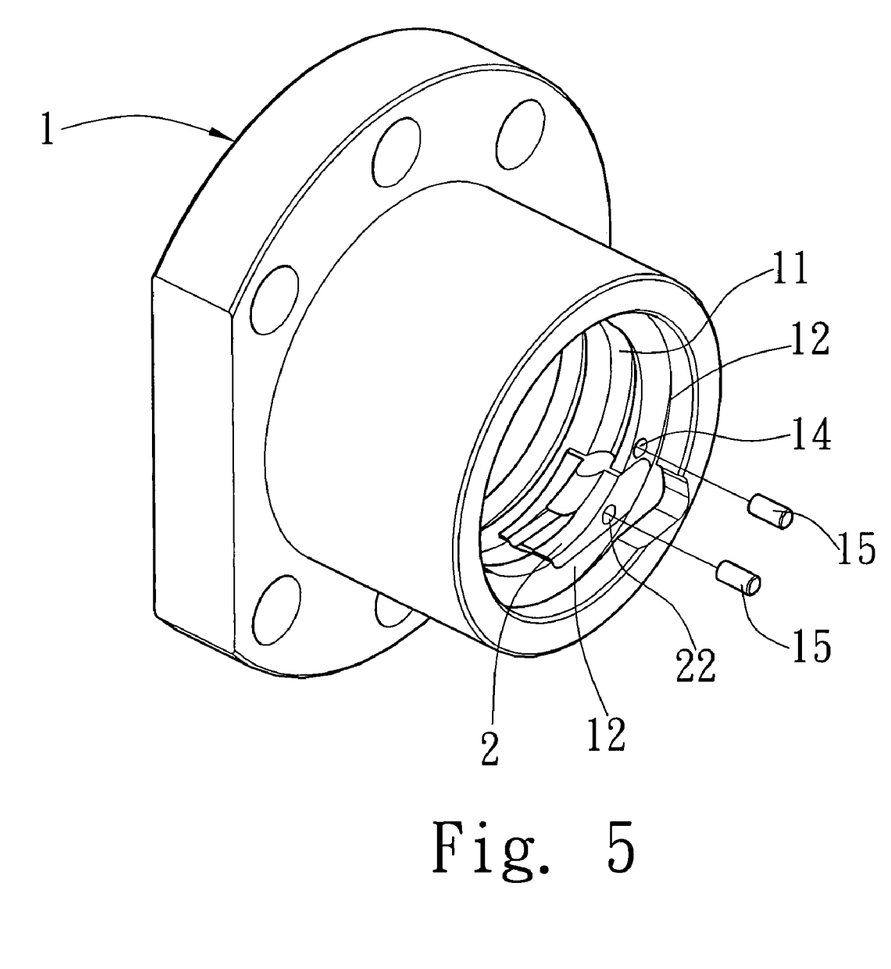
FIG. 5 is a schematic view illustrating how the stop pillars are used in another embodiment of the present invention.
Figure 6:
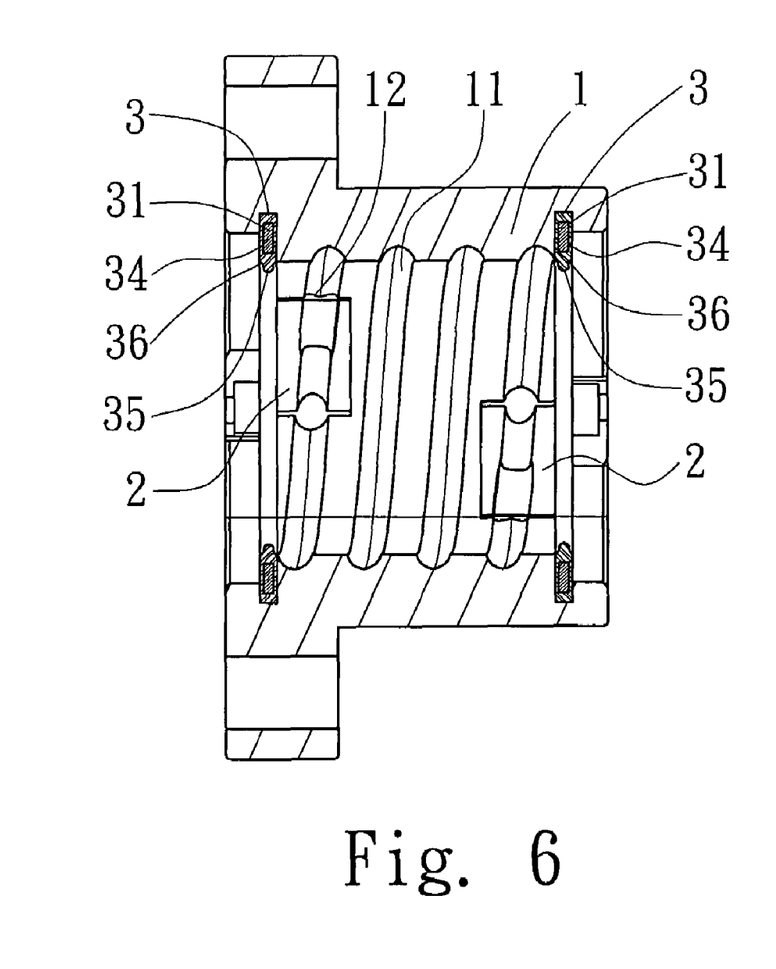
FIG. 6 is a sectional view of an assembled dust cleaning and ball deflecting element fixing mechanism according to the present invention.

Referring to FIG. 5, in another embodiment of the present invention, a confinement hole 14 is provided at the wall of the annular inlaid slot 12 abutting on the ball deflecting element 2, and another confinement hole 22 is provided at the outer side surface of the ball deflecting element 2. The afore said detention holes 32 and 33 are respectively aligned to the confinement holes 22 and 14. With such arrangement, after aligning the two pairs of holes 32, 22 and 33, 14, the scraper 3 can be trammeled to fix at position without turning or slipping. With this structure, a well qualified fixing and dust cleaning mechanism for ball screw unit ball deflecting element can be obtained.

Referring again to FIG. 4 through FIG. 6, in assembling, the ball deflecting element 2 is connected to a circulation tunnel (not shown) at each end of the spiral rolling slot 11 of the nut proper 1, and by gripping the detention holes 32, 33 from two ends of the scraper 3 with a C shaped clamp to squeeze the scraper 3, its diameter is reduced, then placing the scraper 3 in the annular inlaid slot 12 of the nut proper 1, and firmly enclose the resilient soft covering layer around the rolling inlaid slot 12, then at the same time, the ball deflecting element is forcibly imposed on its position.

As the nut proper 1 is coupled with the ball screw, the afore said spiral scrapping tip 35 and the arcuate scrapping edge 36 formed on the soft covering layer 34 is appropriately in contact with the root, side wall and the crest of the rolling spiral slot of the ball screw so as to wipe away the dust, dregs, rabbishes and trashes sticking on the rolling spiral slot.

It emerges from the above description that the present invention is more advantageous compared with the prior arts, namely:

1. Using a resilient soft covering layer to cover onto the C shaped annular packing substantially helps hold the scraper and the ball deflecting element at position without turning or slipping.

2. The scraper has two-fold mission of stably fixing the mechanical structure and cleaning moving track of the ball screw unit. No extra dust cleaning means is needed that contribute to shorten the length of nut proper and minimize the size of entire ball screw unit.

3. The two-fold mission of the scraper effectively save needs of extra component parts and simplify the mechanical structure.

4. More leniency in dimensional allowance due to use of the soft covering layer on the scraper facilitates the fabrication and assembly work leading to curtailing the production cost.

Many changes and modifications in the above described embodiment of the invention can, of course, be carried out without departing from the scope thereof. Accordingly, to promote the progress in science and the useful arts the invention is disclosed and is intended to be limited only by the scope of the appended claims.

What is claimed is:

1. A ball screw unit with dust cleaning and ball deflecting element fixing mechanism having a nut proper sleeved on a screw bolt with rolling balls rolling therebetween to cause a relative motion of the nut proper and the screw bolt, comprising;

the nut proper having a spiral rolling slot in an inner surface thereof to couple with the screw bolt thereby allowing the rolling balls to roll therebetween;

a circulation tunnel formed at an end of the spiral rolling slot of the nut proper;

a ball deflecting element fixed to the circulation tunnel;

an annular inlaid slot formed in the nut proper and outside of the ball deflecting element; and a fixed dust scraper formed into an annular shape and fixed into the annular inlaid slot, the annular dust scraper being made of an annular C shaped packing covered with a resilient covering layer over an outer fringe thereof, wherein a width between two sides of the covering layer is broader than that of the annular inlaid slot so that the scraper is able to forcibly press and fix the ball deflecting element at sides thereof, and an inner fringe of the covering layer is formed into a continuous spiral scrapping tip facing against the rolling spiral slot of the screw bolt, and a side fringe of the spiral scrapping tip is formed into an arcuate scrapping edge facing against a spiral wall and a crest of thread of the screw bolt, wherein at least one stop pillar is provided between the nut proper and the ball deflecting element for fixing the scraper at position, and wherein the stop pillar is provided on a wall surface of the annular inlaid slot of the nut proper abutting on the ball deflecting element, and a corresponding detention hole is formed on the scraper so as to fix the scraper at position on the nut proper by trammeling the stop pillar in the detention hole.

2. The ball screw unit as in claim 1, wherein the covering layer for the scraper is made of rubber.

3. The ball screw unit as in claim 1, wherein the covering layer for the scraper is made of plastic.

4. A ball screw unit with dust cleaning and ball deflecting element fixing mechanism having a nut proper sleeved on a screw bolt with rolling balls rolling therebetween to cause a relative motion of the nut proper and the screw bolt, comprising;

the nut proper having a spiral rolling slot in an inner surface thereof to couple with the screw bolt thereby allowing the rolling balls to roll therebetween;

a circulation tunnel formed at an end of the spiral rolling slot of the nut proper;

a ball deflecting element fixed to the circulation tunnel;

an annular inlaid slot formed in the nut proper and outside of the ball deflecting element; and a fixed dust scraper formed into an annular shape and fixed into the annular inlaid slot, the annular dust scraper being made of an annular C shaped packing covered with a resilient covering layer over an outer fringe thereof, wherein a width between two sides of the covering layer is broader than that of the annular inlaid slot so that the scraper is able to forcibly press and fix the ball deflecting element at sides thereof, and an inner fringe of the covering layer is formed into a continuous spiral scrapping tip facing against the rolling spiral slot of the screw bolt, and a side fringe of the spiral scrapping tip is formed into an arcuate scrapping edge facing against a spiral wall and a crest of thread of the screw bolt, wherein at least one stop pillar is provided between the nut proper and the ball deflecting element for fixing the scraper at position, and wherein the stop pillar is provided on an outside surface of the ball deflecting element, and a corresponding detention hole is formed on the scraper so as to fix the scraper at position on the nut proper by trammeling the stop pillar in the detention hole.

5. The ball screw unit as in claim 4, wherein the covering layer for the scraper is made of rubber.

6. The ball screw unit as in claim 4, wherein the covering layer for the scraper is made of plastic.

7. A ball screw unit with dust cleaning and ball deflecting element fixing mechanism having a nut proper sleeved on a screw bolt with rolling balls rolling therebetween to cause a relative motion of the nut proper and the screw bolt, comprising;

the nut proper having a spiral rolling slot in an inner surface thereof to couple with the screw bolt thereby allowing the rolling balls to roll therebetween;

a circulation tunnel formed at an end of the spiral rolling slot of the nut proper;

a ball deflecting element fixed to the circulation tunnel;

an annular inlaid slot formed in the nut proper and outside of the ball deflecting element; and a fixed dust scraper formed into an annular shape and fixed into the annular inlaid slot, the annular dust scraper being made of an annular C shaped packing covered with a resilient covering layer over an outer fringe thereof, wherein a width between two sides of the covering layer is broader than that of the annular inlaid slot so that the scraper is able to forcibly press and fix the ball deflecting element at sides thereof, and an inner fringe of the covering layer is formed into a continuous spiral scrapping tip facing against the rolling spiral slot of the screw bolt, and a side fringe of the spiral scrapping tip is formed into an arcuate scrapping edge facing against a spiral wall and a crest of thread of the screw bolt, wherein at least one stop pillar is provided between the nut proper and the ball deflecting element for fixing the scraper at position, and wherein a first confinement hole for confining the stop pillar is formed on a wall surface of the annular inlaid slot of the nut proper, and a second confinement hole for confining the stop pillar is formed on an outside surface of the ball deflecting element, and corresponding detention holes are formed at two ends of the scraper so as to simultaneously fix the scraper to the nut proper and the ball deflecting element.

8. The ball screw unit as in claim 7, wherein the covering layer for the scraper is made of rubber.

9. The ball screw unit as in claim 7, wherein the covering layer for the scraper is made of plastic.

* * * * *